United States Patent
Vermeulen et al.

(10) Patent No.: US 10,078,232 B1
(45) Date of Patent: Sep. 18, 2018

(54) ADVANCED OPTICAL MODULATION GENERATION BY COMBINING ORTHOGONAL POLARIZED OPTICAL SIGNALS

(71) Applicant: Acacia Communications, Inc., Maynard, MA (US)

(72) Inventors: Diedrik Vermeulen, New York, NY (US); Christopher Doerr, Middleton, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/797,027

(22) Filed: Jul. 10, 2015

Related U.S. Application Data (60) Provisional application No. 62/023,502, filed on Jul. 11, 2014.

(51) Int. Cl.
| | |
|---|---|
| *G02F 1/01* | (2006.01) |
| *G02F 1/225* | (2006.01) |
| *G02B 6/122* | (2006.01) |
| *G02F 1/21* | (2006.01) |

(52) U.S. Cl.
CPC ............ *G02F 1/011* (2013.01); *G02B 6/1225* (2013.01); *G02F 1/2257* (2013.01); *G02F 2001/212* (2013.01)

(58) Field of Classification Search
CPC .......... G02F 1/011; G02F 1/01; G02F 1/2257; G02F 1/225; G02F 1/21; G02F 2001/212; G02B 6/1225; G02B 6/122
See application file for complete search history.

(56) References Cited

U.S. PATENT DOCUMENTS

| | | | |
|---|---|---|---|
| 7,076,169 B2 | 7/2006 | Shpantzer et al. | |
| 7,257,329 B2 * | 8/2007 | Azadet | H04B 10/5167 398/183 |
| 7,430,257 B1 * | 9/2008 | Shattil | H04B 1/707 342/367 |
| 7,460,793 B2 | 12/2008 | Taylor | |
| 8,748,797 B1 * | 6/2014 | Decker | H03F 3/08 250/214 R |
| 8,879,873 B2 * | 11/2014 | Goh | H04B 10/5161 385/3 |
| 9,143,238 B2 * | 9/2015 | Roberts | H04B 10/532 |
| 9,166,628 B2 * | 10/2015 | Pfau | G06F 11/10 |
| 9,166,689 B2 * | 10/2015 | Sun | H04B 10/25073 |
| 9,195,079 B2 | 11/2015 | Doerr et al. | |
| 9,223,184 B2 * | 12/2015 | Yamazaki | G02F 1/2255 |
| 9,270,380 B2 * | 2/2016 | Barton | H04B 10/505 |

(Continued)

OTHER PUBLICATIONS

Winzer et al., Advanced Optical Modulation Formats. Proc IEEE. May 2006;94(5):952-85. doi: 10.1109/JPROC.2006.873438.

*Primary Examiner* — Andrew Jordan
(74) *Attorney, Agent, or Firm* — Wolf, Greenfield & Sacks, P.C.

(57) ABSTRACT

Optical modulators and modulation techniques for advanced optical modulation formats are described. An optical modulator may include two optical modulators in parallel optical paths, and optical powers in the two paths may be unequal. Polarization in the two paths may be orthogonal, and modulated outputs from each path may be combined to produce multilevel modulation formats.

23 Claims, 4 Drawing Sheets

(56) References Cited

U.S. PATENT DOCUMENTS

| | | | |
|---|---|---|---|
| 2002/0057218 A1* | 5/2002 | Smith | H04B 7/10 342/365 |
| 2003/0200063 A1* | 10/2003 | Niu | G01B 11/00 703/2 |
| 2008/0095486 A1* | 4/2008 | Shastri | G02F 1/2255 385/3 |
| 2010/0231911 A1* | 9/2010 | Fischer | G01J 4/02 356/364 |
| 2013/0308898 A1* | 11/2013 | Doerr | G02B 6/428 385/14 |
| 2013/0322809 A1* | 12/2013 | Goh | H04B 10/5161 385/3 |
| 2014/0003824 A1* | 1/2014 | Sun | H04B 10/25073 398/202 |
| 2014/0112611 A1 | 4/2014 | Vermeulen et al. | |
| 2014/0153075 A1* | 6/2014 | Malacarne | H04B 10/541 359/238 |
| 2014/0314366 A1* | 10/2014 | Yamazaki | G02F 1/2255 385/3 |
| 2015/0132013 A1* | 5/2015 | Vermeulen | H04B 10/5053 398/184 |
| 2015/0139648 A1* | 5/2015 | Striegler | H04L 12/12 398/65 |
| 2015/0171895 A1* | 6/2015 | Pfau | G06F 11/10 714/776 |

* cited by examiner

*FIG. 6*

ADVANCED OPTICAL MODULATION GENERATION BY COMBINING ORTHOGONAL POLARIZED OPTICAL SIGNALS

RELATED APPLICATIONS

The present application claims the benefit under 35 U.S.C. § 119(e) of U.S. Provisional Patent Application Ser. No. 62/023,502 entitled "ADVANCED OPTICAL MODULATION GENERATION BY COMBINING ORTHOGONAL POLARIZED OPTICAL SIGNALS," filed Jul. 11, 2014, which is incorporated herein by reference in its entirety.

BACKGROUND

Field

The present application relates to optical modulation systems for encoding signals in optical communication systems.

Related Art

There are a number of different modulation schemes and modulation devices that are used to encode information in optical communication systems. Among the more basic schemes are amplitude modulation (AM), which alters the amplitude of an optical carrier wave between two values, and phase-shift keying (PSK), which abruptly alters the phase of an optical carrier wave between two values. As the amount of data to be encoded optically has increased, more complex or advanced optical modulation techniques have been developed. One advanced optical modulation technique is known as multilevel pulse-amplitude modulation (PAM-N).

Multilevel pulse amplitude modulation may be implemented conventionally using a multilevel electrical driver signal to an optical modulator. Alternatively, multilevel pulse amplitude modulation may be implemented conventionally with a segmented Mach-Zehnder interferometer optical modulator. For example, two or more phase modulators may be incorporated in one or both arms of the interferometer. The phase modulators may have different lengths, and are activated to apply a number N of different phase shifts. The phase shifts cause an output from the interferometer to vary between N distinct amplitude levels, which can be used to encode information more efficiently than a binary output. Such a modulator may allow for nonlinear modulator drivers and accept non-return-to-zero (NRZ) encoding.

BRIEF SUMMARY

The present technology relates to optical modulation systems that may be used for advanced optical modulation formats in optical communication links. The modulation systems can achieve high spectral efficiency, and can be dynamically adapted to accommodate different modulation formats for different data link conditions. According to some embodiments, an optical modulation system may comprise a splitter having an input port, a first output port and a second output port, wherein the splitter is configured to divide optical power received at the input port unequally to the first output port and second output port. An optical modulation system may further include a first optical path connected to the first output port, a first optical modulator located in the first optical path, a second optical path connected to the second output port, and a second optical modulator located in the second optical path. In some aspects, an optical modulation system may also include a polarization rotator located in the first or second optical path and configured to make a polarization of a first optical signal in the first optical path approximately orthogonal to a polarization of a second optical signal in the second optical path, and a combiner having a first input port connected to the first optical path and a second input port connected to the second optical path and configured to combine the first optical signal and second optical signal into an output signal.

In some embodiments, an optical modulation system may comprise a laser having a first output port and a second output port configured to output unequal amounts of power, a first optical path connected to the first output port, a first optical modulator located in the first optical path, a second optical path connected to the second output port, and a second optical modulator located in the second optical path. An optical modulation system may further include a polarization rotator arranged to make a polarization of a first optical signal in the first optical path approximately orthogonal to a polarization of a second optical signal in the second optical path, and a combiner having a first input port connected to the first optical path and a second input port connected to the second optical path and configured to combine the first optical signal and second optical signal into an output signal.

Methods of optical modulation for encoding information over optical communication links are also described. In some embodiments, a method to encode information onto an optical signal may comprise acts of splitting, with an optical splitter, optical power unequally into a first optical path and a second optical path, modulating, with a first optical modulator, an optical signal in the first optical path to produce a first modulated signal, and modulating, with a second optical modulator, an optical signal in the second optical path to produce a second modulated signal. A method of optical modulation may further include rotating polarization to make the polarization of the first modulated signal substantially orthogonal to the polarization of the second modulated signal, and combining, with an optical combiner, the first modulated signal and second modulated signal after polarization rotation to produce an output signal.

In some embodiments, a method of encoding information with an optical modulation system may comprise acts of producing simultaneously, with a laser, a first output signal and a second output signal, receiving the first output signal in a first optical path, and receiving the second output signal in a second optical path. A method of encoding information may further include modulating, with a first optical modulator, an optical signal in the first optical path to produce a first modulated signal, modulating, with a second optical modulator, an optical signal in the second optical path to produce a second modulated signal, rotating polarization to make the polarization of the first modulated signal substantially orthogonal to the polarization of the second modulated signal, and combining, with an optical combiner, the first modulated signal and second modulated signal after polarization rotation to produce an output signal.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

The present technology pertains to optical modulation systems that can be used for advanced optical modulation formats, such as multilevel PAM-N formats having a number of signal levels equal to or greater than four. An optical modulation system, according to the present embodiments, may include parallel optical paths or branches that include at least one optical modulator in each optical path. A received optical signal may be split into each optical path, and modulated in each optical path by the optical modulators to encode information onto an optical carrier wave. The system may include polarization rotation to make the polarizations of optical signals in the parallel paths orthogonal or approximately orthogonal. Modulated optical signals from the two optical paths may be combined with an optical combiner into a multilevel modulated signal for transmitting the encoded information over an optical link. The optical link may comprise single mode or multimode optical fiber.

In some implementations, a received optical carrier wave is split unequally into the two optical paths of the modulation system. For example, an optical power in a first optical path intentionally differs from an optical power in a second optical path according to predetermined ratios. In some modulation systems, a power-splitting ratio is dynamically tunable while the modulation system is in service. By tuning the power splitting ratio, an optical modulation system according to the present embodiments can convert from a first modulation format to a different second modulation format (e.g., from four-level pulse-amplitude modulation format to polarization-multiplexed modulation format).

The aspects and embodiments described above, as well as additional aspects and embodiments, are described further below. These aspects and/or embodiments may be used individually, all together, or in any combination of two or more, as the application is not limited in this respect.

By way of introduction, advanced modulation formats are interesting for optical communication applications which require high spectral efficiency (bit/s-Hz). Traditionally, high spectral efficiencies are required in metro, long-haul, and submarine optical networks where the optical link cost is very high, and increasing the spectral efficiency can reduce the cost per bit of data transmission. The high optical link cost in these high-end telecom systems makes it possible to use multiple, high-performance, state-of-the-art, and fully-tunable optical components in transceivers.

The inventors have recognized and appreciated that datacenter communication solutions have different requirements from the long-link, high-end telecom systems. Typically, datacenter communication solutions are very cost-sensitive, and may be governed by a different set of rules than the high-end telecom systems. For example, datacenter communications typically involve shorter optical links (on the order of 100 meters), so that one can use multi-mode-fiber (MMF) ribbon cables in combination with directly modulated vertical-cavity surface-emitting lasers (VCSELs). However for bitrates higher than about 10 gigabit per second (Gb/s), the VCSEL technology encounters significant challenges. Additionally, the size of datacenters is increasing and some facilities require optical links having distances of up to 2 kilometers. In some cases, there can be significant inter-data-center communication links having distances up to 80 km. Due to signal distortions, MMF cannot readily support optical communications over optical links at these longer distances. Instead, single-mode fiber (SNF) may be required. The increase in optical link distances at the datacenters is expected to be accompanied by a demand in higher per-fiber data transport capacities. Additionally, it is desirable to maintain a low transceiver cost for datacenters.

Although multi-wavelength, integrated optical solutions are available, they may not be suitable for datacenter communications. Multi-wavelength systems may require multiple lasers, wavelength multiplexers, and demultiplexers. Although these components and wavelength multiplexing can boost spectral efficiency to very high levels, they add appreciable complexity and cost to a datacenter communication system. In some cases, the added complexity and high spectral efficiency may not be needed.

One single-wavelength solution is to use multilevel optical modulation techniques for encoding signals. An example might be an electro-absorption modulator driven by a highly linear driver amplifier (LDA) preceded by a level encoder (LE) and digital to analog convertor (DAC). These components can enable digital linearization of the modulator transfer function, and provide multilevel coding with non-equal level spacing for improved signal-to-noise ratio (SNR) performance. However, the inventors have recognized and appreciated that LDA, LE, and DAC components will consume an appreciable portion of the power budget (~1.25 W) for a transceiver.

Figure 1:
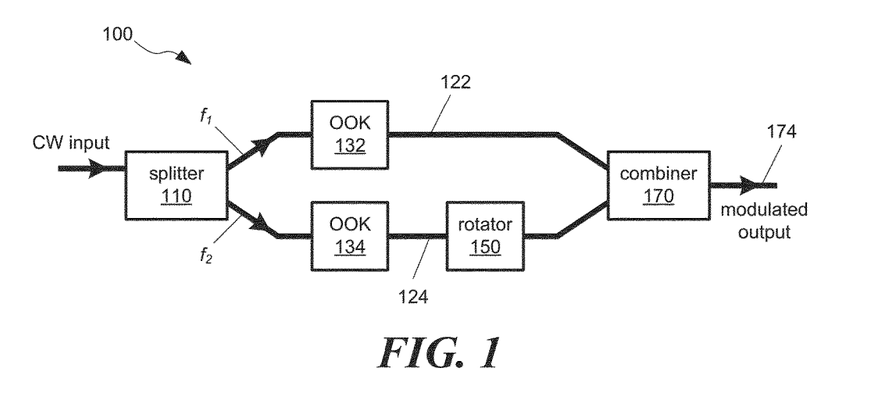
FIG. 1 depicts an optical modulation system, according to some embodiments.

According to some embodiments, single-wavelength, multilevel, pulse-amplitude modulation schemes (PAM-4, PAM-8, PAM-N) may be suitable for reducing electronic rates to levels that are low enough for datacenter communications. Such modulation systems may only require a single photodetector and associated signal processing electronics (e.g., analog-to-digital converter and digital signal processing circuitry) for detecting and decoding an encoded optical signal. These detection components can reduce the complexity and cost of an optical receiver. In some implementations, an optical modulation system 100 for a PAM-N signal encoder may comprise a compact, photonic integrated circuit (PIC) as depicted in FIG. 1.

Although optical modulation systems are described primarily as PIC systems, in some cases they may be implemented using fiber-optics and fiber-optic components (e.g., fiber-optic splitters, fiber-optic phase modulators, fiber lasers, fiber-optic combiners, etc.). The invention is not limited to PICs.

According to some embodiments, an optical modulation system 100 may comprise an optical splitter 110 arranged to receive an optical signal at an input and divide the optical signal into two optical paths 122, 124. The received optical signal may be a continuous-wave output from a laser, for example, and comprise a carrier wave onto which information will be encoded by the optical modulation system 100. An optical modulation system may further include a first modulator 132 in the first optical path 122, and a second modulator 134 in the second optical path 124. According to some embodiments, the modulation system may include at least one polarization rotator 150 located in one or both of the optical paths. The system may further include an optical combiner 170 that is arranged to receive modulated signals from the first and second optical paths and combine the received modulated signals into an output signal that is provided to an output port 174 of the system.

The first and second optical paths 122, 124 may comprise integrated, single-mode, optical waveguides. According to some embodiments, the waveguides may be fabricated in a semiconductor material (e.g., silicon, indium phosphide, gallium arsenide, or alloys thereof). The waveguides may have transverse dimensions between approximately 50 nm and approximately 2 microns. For example, a single-mode waveguide may have a height between approximately 50 nm and approximately 300 nm and a width between approximately 200 nm and approximately 700 nm. The waveguides may be designed to be single-mode for optical wavelengths between about 1200 nm and about 1700 nm.

The polarization rotator 150 may comprise any suitable integrated polarization rotating device that receives an input optical signal having a first polarization and rotates the first polarization into a second polarization that is different from the first polarization. According to some embodiments, the second polarization may be substantially orthogonal to the first polarization. In some cases, the second polarization may be partially orthogonal to the first polarization, and a second polarization rotator 150 in the modulation system 100 may rotate a third polarization of a received optical signal to a fourth polarization, wherein the fourth polarization is substantially orthogonal to the first polarization. In various embodiments, the polarization rotator 150 or rotators are arranged such that the optical signals from the first optical path 122 and second optical path 124, when combined at the combiner 170, have substantially orthogonal polarizations.

A polarization rotator 150 or rotators may be located anywhere in the optical modulation system 100. In some embodiments, a polarization rotator may be located after a modulator 134, as depicted. In some cases, a polarization rotator may be located before a modulator 134. In some implementations, a polarization rotator may be incorporated (e.g., as an asymmetric waveguide) in either or both of the splitter 110 and combiner 170.

According to some embodiments, a polarization rotator 150 may comprise an integrated high-efficiency broadband polarization rotator, e.g., as described in D. Vermeulen, et al., "High Efficiency Broadband Polarization Rotator on Silicon-On-Insulator," *Proceeding of the 7th IEEE International Conference on Group IV Photonics* (2010) pp. 42-44, which is incorporated herein by reference. For example, a polarization rotator 150 may comprise a portion of an optical waveguide and/or surrounding structure having an asymmetric cross-section. In some embodiments, an asymmetrical portion of a waveguide may be formed by fabricating an asymmetrical overlay over the portion of the waveguide. In the asymmetrical region, transverse-electric (TE) and transverse-magnetic (TM) modes may beat and convert to TE or TM polarization, or a desired combination thereof, at the end of the asymmetric region.

According to some implementations, an optical combiner 170 may comprise a polarization combiner (or a polarization beam splitter operated in reverse). The combiner may comprise a multi-mode interference (MMI) coupler having a slab waveguide region in some cases. According to some embodiments, a combiner 170 may comprise a coupled-waveguide coupler having closely-spaced waveguides in which optical modes couple between the waveguides. An optical combiner 170 may have two input ports arranged to receive a first modulated optical signal from the first optical path 122 having a first polarization and receive a second modulated optical signal having a second polarization. The combiner may combine the two modulated signals onto a waveguide that couples to an output port 174. Because the polarizations of the two modulated signals are substantially orthogonal when received, the two signals may not appreciably interfere optically when combined onto a waveguide. Further, the two optical signals having different amplitudes can be combined without appreciable insertion loss (e.g., less than 6 dB). In some implementations, a combiner may have two or more output ports where at least one additional port may include a scaled copy of a combined modulated signal at the output port 174.

In some embodiments, an optical splitter 110 may comprise an MMI coupler or a coupled-waveguide coupler. A splitter may have at least one input port and at least two output ports. A splitter 110 may be configured to receive an optical signal of power $P_i$ at an input port and divide the optical signal unequally among the at least two output ports. The splitter may exhibit low insertion loss (e.g., less than 6 dB). For example, a splitter 110 may provide a first fraction of the received power $f_1 P_i$ to the first optical path 122 and a second fraction of the received power $f_2 P_i$ to the second optical path 124. The first fraction $f_1$ may be approximately $\frac{2}{3}$ and the second fraction $f_2$ may be approximately $\frac{1}{3}$ in some embodiments. In some implementations, the first fraction may be approximately $\frac{4}{7}$ and the second fraction may be approximately $\frac{3}{7}$. Other fraction values may be used in other embodiments.

Figure 2A:
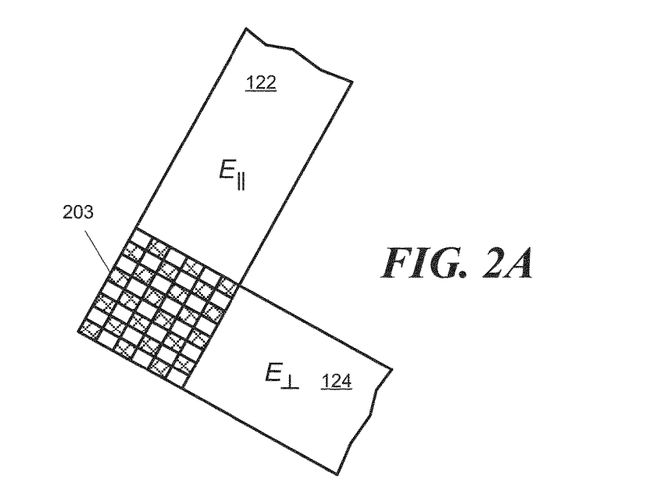
FIG. 2A depicts an optical splitter, according to some embodiments.

In another embodiment, the optical functions of splitting a received power and providing orthogonal polarizations to two optical paths may be achieved with a polarizing beam splitter element, as depicted in FIG. 2A. A polarizing beam splitter 203 may comprise a two-dimensional (2-D) patterned grating coupler adjacent two waveguides 122, 124. An example of a polarizing beam splitter is described in D. Taillert et al., "A Compact Two-Dimensional Grating Coupler Used as a Polarization Splitter," *IEEE Photon. Tech. Lett.*, vol. 15 (2003) pp. 1249-1251. The coupler may be configured to receive light from an optical fiber and couple the light into two adjacent optical waveguides 122, 124 and provide a first polarization (e.g., TE polarization) to a first waveguide and an orthogonal polarization to the second waveguide. Optical modulators (not shown) may be located along each waveguide. In some embodiments, a polarizing beam splitter may be used as an optical combiner 170 additionally or alternatively.

Figure 2B:
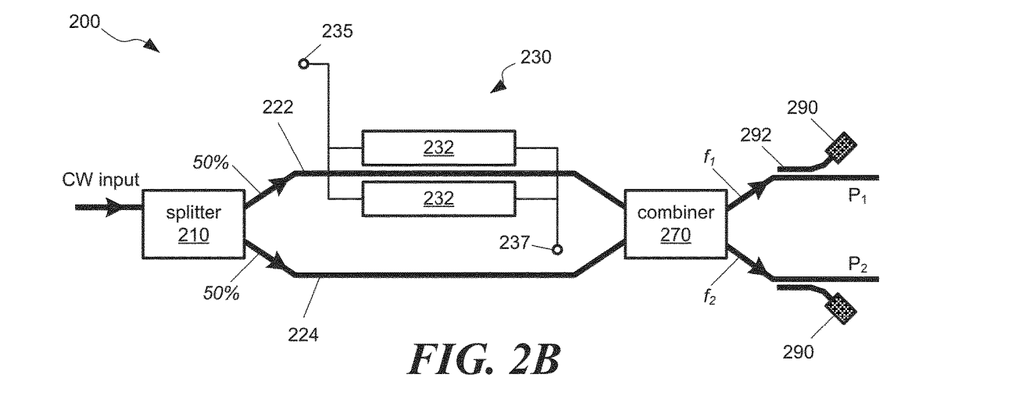
FIG. 2B depicts a tunable splitter, according to some embodiments.

In some instances, a splitter 110 may have a fixed splitting ratio (i.e., $f_1$ and $f_2$ are fixed values for the splitter. In other embodiments, a splitter may be tunable so that $f_1$ and $f_2$ may be changed dynamically at any time the splitter is in service. An example of a tunable splitter 200 is depicted in FIG. 2B. According to some embodiments, a tunable optical splitter 200 may comprise a Mach-Zehnder interferometer having a first optical path or arm 222 and a second arm 224 of approximately equal lengths. The optical arms may comprise integrated, single-mode optical waveguides. The tunable splitter may include a fixed optical splitter 210, which may comprise an MMI coupler or a coupled-waveguide coupler according to some embodiments. The fixed optical splitter 210 may be configured to divide received optical power at an input port substantially equally into two output ports. The output ports may connect to the two interferometer arms 222, 224, so that the optical field from each output port of the splitter 210 can travel to and recombine coherently at optical combiner 270. The optical combiner 270 may comprise an MMI coupler or coupled-waveguide coupler having at least two input ports and at least one output port. In some embodiments, the optical combiner 270 has two output ports $P_1$, $P_2$.

A tunable splitter 200 may further include a phase modulator 230 in at least one arm 222. The phase modulator may comprise a thermo-optic phase modulator that includes one or more resistive heating elements 232 located adjacent to a waveguide. The phase modulator may include electrical contacts 235, 237 and conductive traces through which an electrical current may be applied to the resistive heating elements. The applied current may heat the resistive heating elements 232 and alter a temperature of the adjacent waveguide 222. As the waveguide temperature changes, the value of its refractive index will change. The change in the refractive index may then alter the phase of an optical signal traversing the first optical path 222. Changes to the phase of an optical signal in at least one arm of the tunable splitter 200 cause the power from each output port $P_1$, $P_2$ to change in a deterministic way. In this manner, the values of power-splitting fractions $f_1$ and $f_2$ can be tuned dynamically when the tunable splitter is in service.

Other types of phase modulators may be used in other embodiments. For example, an electro-optic phase modulator comprising a p-n or p-i-n junction formed in a waveguide may be used in some cases. An electro-optic phase modulator may be formed along a portion of a waveguide in one arm of the splitter 200.

In some implementations, a tunable splitter may include optical taps 292 and photodetectors 290 arranged to sense an amount of optical power delivered from each exit port. An optical tap may comprise a short length of integrated optical waveguide that runs parallel and in close proximity (within about two microns) to an output waveguide from the splitter 200, so that a small portion of output power may couple to the optical tap 292 and be detected by a photodetector 290. Electrical signals from the photodetectors 290 may be processed and used in a feedback circuit to control a ratio of power delivered from the two output ports $P_1$, $P_2$. For example, a detected power ratio may be used to control an amount of electrical current applied to the thermo-optic phase modulator 230, so that a substantially constant power ratio can be maintained between the two output ports.

Referring again to FIG. 1, an optical modulation system 100 may include on-off keying (OOK) modulators in two optical paths 122, 124. The OOK modulators 132, 134 may modulate an optical signal (e.g., a CW carrier wave) from an "on" state having a first power level to an "off" state having substantially no power to encode information onto the carrier wave, for example. In some implementations, an OOK modulator may be formed from a Mach-Zehnder interferometer, similar to that depicted in FIG. 2B. For encoding information, a high-speed phase modulator may be used instead of a thermo-optic phase modulator 230. For example, the thermo-optic phase modulator may be replaced by an electro-optic phase modulator. An electro-optic phase modulator may comprise a vertical or lateral p-n or p-i-n junction formed along a portion of a waveguide in one arm of the interferometer. A modulator 122 or 124 may be implemented in other ways which include, but are not limited to, an electro-absorption modulator (EAM) or ring modulator comprising one or more tunable photonic ring resonators. Regardless of the type of modulator, an optical modulation system 100 may be configured, such that the first and second optical modulators are driven substantially synchronously. For example, the modulation may be timed such that the centers of symbols encoded by the modulators are aligned when the symbols exit the combiner 170.

In operation, an optical modulation system 100 may receive a substantially constant CW input optical signal. The input signal may come from a semiconductor laser, which may be integrated onto a same semiconductor chip as the modulation system or onto a separate semiconductor chip. The splitter 110 may divide the received optical signal into the first optical path 122, having a power fraction of approximately $\frac{2}{3}$ of the received optical signal, and into a second optical path 124, having a power fraction of approximately $\frac{1}{3}$. On-off keying modulators 132, 134 may be operated in each optical path to either turn on the optical signal in the optical path or substantially block the optical signal in the respective path. The polarization of at least one of the optical signals may be rotated, so that the polarizations of the two modulated optical signals are substantially orthogonal when combined by the combiner 170.

By modulating the optical signal in the first optical path 122 on or off, a signal value of 0 or $(\frac{2}{3})P_i$ can be obtained from the first optical path. By modulating the optical signal in the second optical path 124 on or off, a signal value of 0 or $(\frac{1}{3})P_i$ can be obtained from the second optical path. Because the polarizations from the two paths 122, 124 are orthogonal, the signals are combined without substantial coherent interference at the combiner 170, to provide four distinct bit levels: 0, $(\frac{1}{3})P_i$, $(\frac{2}{3})P_i$, and $P_i$. Accordingly, the modulation system depicted in FIG. 1 can provide PAM-4 modulation format at output port 174. In some implementations, the polarizations from the two optical paths 122, 124 may not be precisely orthogonal, and a communication system may tolerate some coherent interference between the two signals.

When a tunable splitter 110 is used for the optical modulation system, the splitting fraction may be tuned such that all power flows through one optical path 122 ($f_1=1$). In this case, the optical modulation system can dynamically convert to a two-level, amplitude modulation (or regular OOK) encoder. Alternatively, the splitting fraction may be tuned such that the received power is divided equally between the two optical paths 122, 124 ($f_1=f_2=\frac{1}{2}$). In this case, the optical modulation system can dynamically convert to a polarization multiplexed OOK encoder. Such conversions may be made if an optical link becomes impaired and cannot distinguish between four levels or support a higher bit rate, for example, but can distinguish between two levels at a lower bit rate.

Figure 3:
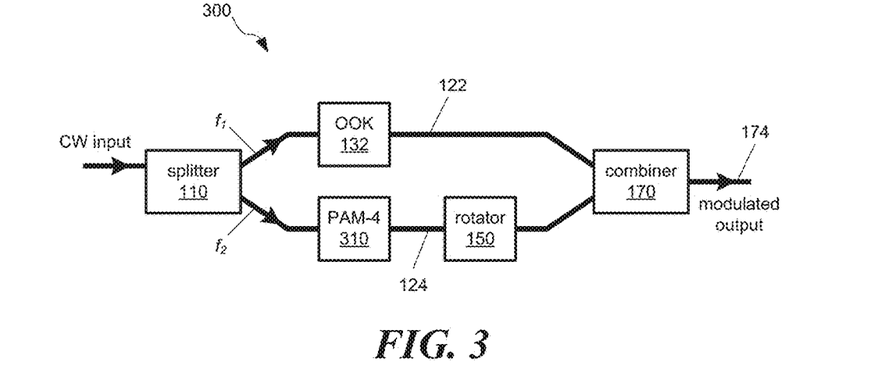
FIG. 3 depicts an optical modulation system, according to some embodiments.

Another embodiment of an optical modulation system 300 is depicted in FIG. 3. According to this embodiment, a first optical path 122 may comprise an on-off keying modulator 132, and a second optical path 124 may comprise a PAM-4 modulator 310. The other system components may be the same as described for the modulation system depicted in FIG. 1. In the embodiment of FIG. 3, power-splitting fractions at the splitter 110 may be $f_1$ approximately equal to $\frac{4}{7}$ and $f_2$ approximately equal to $\frac{3}{7}$. In operation, the modulator 132 in the first optical path 122 may modulate an optical signal between two power levels: 0 and $(\frac{4}{7})P_i$. A PAM-4 modulator 310 in the second optical path 124 may modulate its optical signal between four values: 0, $(\frac{1}{7})P_i$, $(\frac{2}{7})P_i$, and $(\frac{3}{7})P_i$. Therefore, the two optical modulators 132, 310 can modulate a received CW signal to eight levels, providing PAM-8 modulation format at the output port 174.

When a tunable splitter 110 is used for the optical modulation system 300, the splitting fraction may be tuned such that all power flows through the first optical path 122 ($f_1=1$). In this case, the optical modulation system can dynamically convert to a two-level, amplitude modulation (or regular OOK) encoder. Alternatively, the splitting fraction may be tuned such that all power flows through the second optical path 124 ($f_2=1$). In this case, the optical modulation system can dynamically convert to a PAM-4 encoder.

Figure 4A:
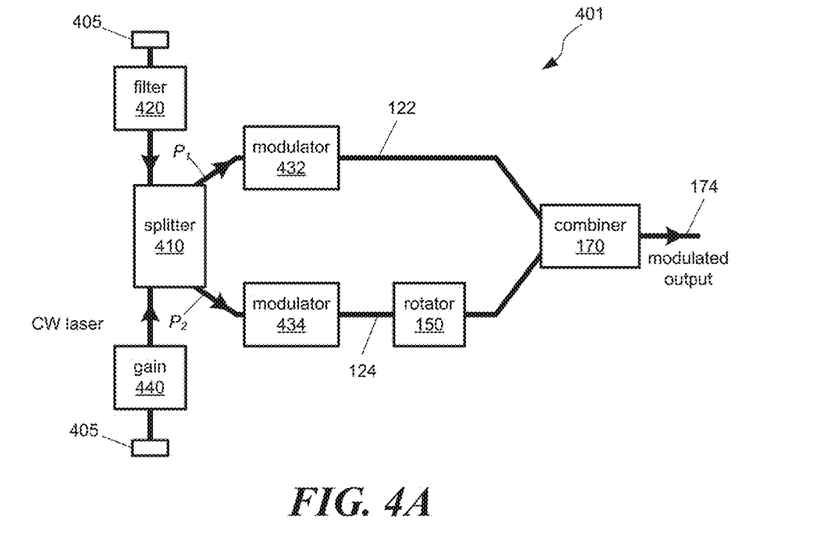
FIG. 4A depicts a laser integrated with an optical modulation system, according to some embodiments.

In some embodiments, the optical modulation systems described above may be integrated with a laser. FIG. 4A depicts one embodiment of an integrated optical modulation system 401 that includes a continuous-wave semiconductor laser. The CW laser may be fully integrated into a photonic integrated circuit with the optical modulation system, and may be on a same chip as the optical modulation system. In other embodiments, the laser may be fabricated on an adjacent chip and coupled to a chip that includes the optical modulation system. For example, the laser may be fabricated on the semiconductor chip comprising indium phosphide and/or its alloys, and the optical modulation system may be fabricated on a separate photonic chip (e.g., a separate silicon photonics chip).

According to some embodiments, an integrated CW laser may comprise two cavity reflectors 405, a semiconductor gain medium 440, and a tunable filter 420 that is configured to select a lasing wavelength. The laser may further include an intracavity optical splitter 410, which may comprise a multimode interference couple or a coupled-waveguide coupler. The intracavity optical splitter may be tunable, in some embodiments, or maybe a fixed splitter that provides output powers $P_1$, $P_2$ to two output ports. The two output ports may couple to two optical paths (e.g., integrated, single-mode optical waveguides) of an optical modulation system. The integrated optical modulation system 401 may further include optical modulators 432, 434 in two optical paths 122, 124, and at least one polarization rotator 150, as described above in connection with FIG. 1 and FIG. 3. The optical modulators may be OOK modulators, PAM-4 modulators, PAM-8 modulators, etc.

In operation, the splitter 410 is selected to provide a desired power ratio from the two output ports of the laser. For example, for PAM-4 modulation format, the power ratio may be $P_1/P_2 \cong 2$. For PAM-8 modulation format, the power ratio may be $P_1/P_2 \cong 4/3$. Other modulation formats may have other power ratios. Signals provided to each modulator 432, 434 are modulated to encode information and the signals are recombined at combiner onto an output port 174, as described above. In some implementations, optical isolators may be located between the splitter 410 and each optical modulator 432, 434 to prevent or reduce reflections of laser light from the optical modulation components. Such reflections may destabilize the laser and generate amplitude noise.

Figure 4B:
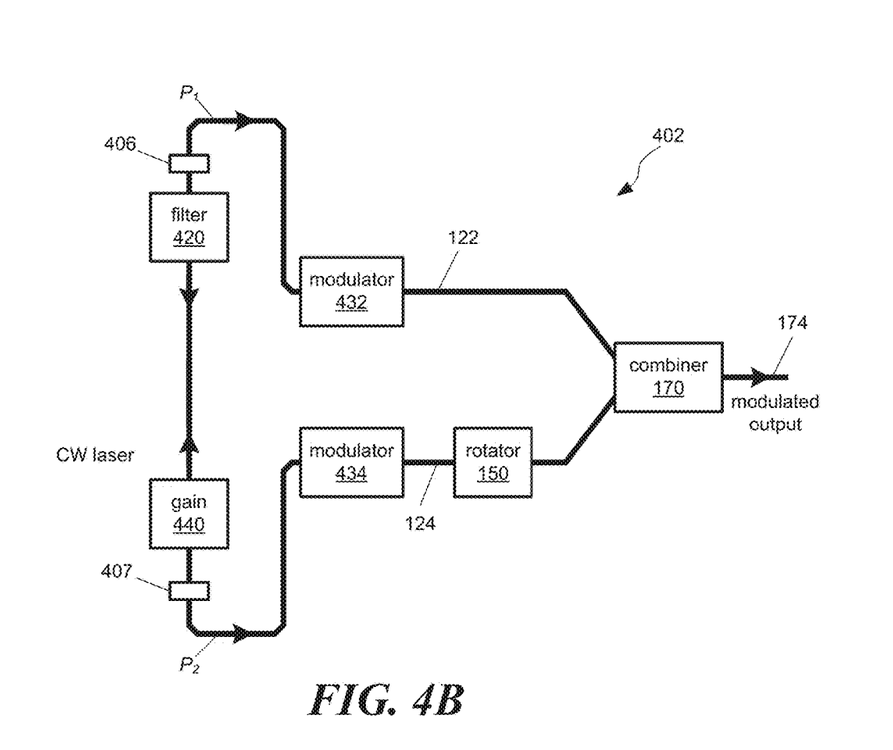
FIG. 4B depicts a laser integrated with an optical modulation system, according to some embodiments.

FIG. 4B depicts an alternate embodiment of an integrated optical modulation system 402. According to some embodiments, cavity reflectors 406, 407 of the laser cavity may be partly transmitting at fixed amounts. For example a first cavity mirror may transmit a first amount of power $P_1$, and a second cavity reflector may transmit a second amount of power $P_2$. The optical signal from each mirror may be provided to the optical modulators 432, 434 for signal encoding. The splitter 410 is selected to provide a desired power ratio from the two output ports of the laser. For PAM-4 modulation format, the power ratio from the two cavity reflectors may be $P_1/P_2 \cong 2$. For PAM-8 modulation format, the power ratio may be $P_1/P_2 \cong 4/3$. Other modulation formats may have other power ratios. In some implementations, optical isolators may be located between the cavity mirrors and each optical modulator 432, 434. Signal modulation and information encoding may be as described above.

Figure 5:
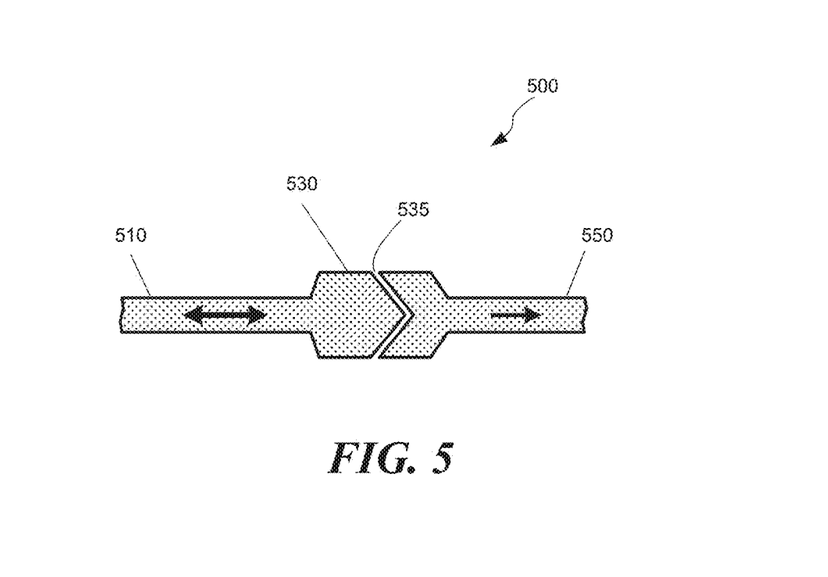
FIG. 5 depicts an output coupler for an integrated laser, according to some embodiments.

FIG. 5 depicts one example of an integrated cavity reflector 500 configured to transmit a portion of incident optical power. The reflector 500 may be used as a cavity reflector 406, 407 for an embodiment depicted in FIG. 4B. In some embodiments, a reflector 500 may comprise a first waveguide 510 coupled to a second waveguide 550 through a multimodal interference region 530. The multimodal interference region may comprise a groove 535 etched into the interference region. The depth and width of the groove 535 may determine an amount of power that is coupled to the second waveguide 550 from the first waveguide 510, and an amount of incident power that is reflected back to the laser cavity. In some implementations, the majority of power incident on the reflector 500 from the first waveguide 510 is reflected back to the first waveguide and laser cavity.

Although the optical modulation systems of FIG. 1, FIG. 3, FIG. 4A, and FIG. 4B are primarily described as including OOK and PAM-4 optical modulators, other modulators may be used in additional embodiments. For example, some optical modulation systems may comprise, but are not limited to, a duo-binary modulator, a quadrature phase shift keying (QPSK) modulator, or higher-order PAM-N modulator instead of an OOK modulator.

The optical modulation systems described above may include several desirable attributes for datacenter communication systems. For example, the optical modulation systems may support regular NRZ signals and operate with limiting amplifiers, without the need for digital to analog converters in a transceiver. Such simplification can reduce the cost, complexity, and power consumption of transceivers. Additionally, the modulation format is adaptive and can be switched to between various formats as described above, depending on, or responsive to optical link conditions. When an OOK modulator is implemented as a Mach-Zehnder interferometer, the optical modulation system allows larger phase swings of the inner modulators than is possible for conventional segmented Mach-Zehnder interferometers used in conventional multilevel modulation formats. A possible benefit for the present optical modulation system could be reduced inter symbol interference (ISI). Additional aspects include integration of at least the splitter, polarization rotator, and combiner on a photonics chip.

According to some embodiments, the above-described advanced modulation systems may be included in a multi-channel PIC. A multi-channel PIC may comprise integrated photonic circuitry for carrying multiple optical signals corresponding to multiple communication channels. When implemented on a multi-channel PIC, one or more components of an advanced optical modulation system may be shared between two or more communication channels. For example, a splitter, polarization rotator, and/or combiner may be shared among two or more channels. The channels may be divided and/or combined by either combiners or wavelength multiplexers before entering a shared component and after exiting a shared component.

Figure 6:
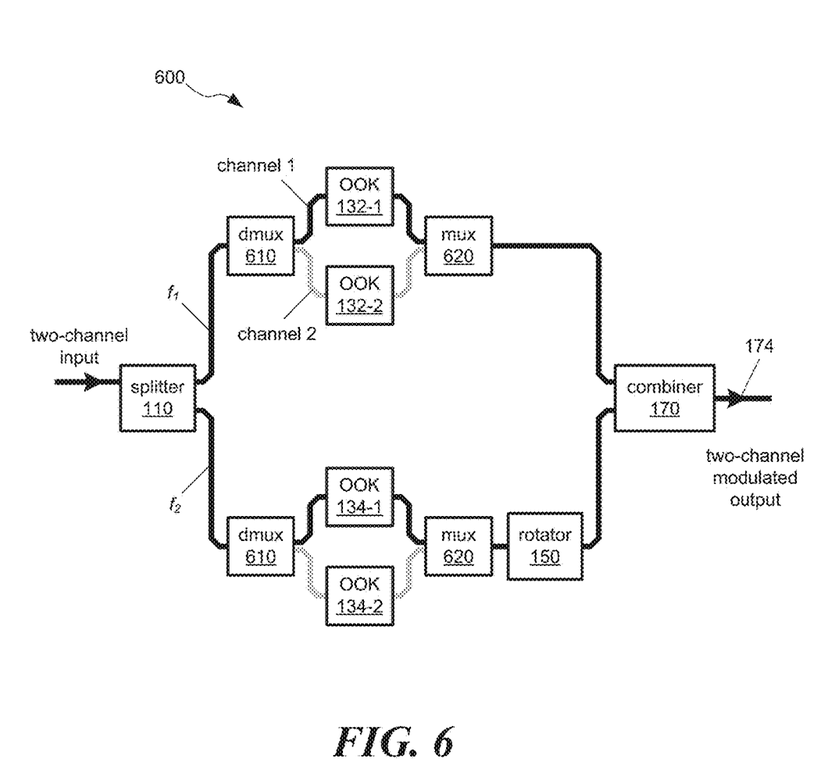
FIG. 6 depicts a multi-channel advanced optical modulation system in which optical components are shared among different channels, according to some embodiments.

FIG. 6 depicts just one example of how components of an advanced optical modulation system 600 may be shared among plural signal channels. A multiplexed input signal (e.g., two carriers at different wavelengths) may be received at a splitter 110 and divided into two optical paths having power fractions $f_1$ and $f_2$. Wavelength demultiplexers 610 may separate the two channels into two optical paths so that modulator pairs (132-1, 134-1), (132-2, 134-2) may encode different information onto the two channels. Wavelength multiplexers 620 may combine the channels for polarization rotation and/or polarization combining to provide two channels at output port 174.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

What is claimed is:

1. An optical modulation system comprising:
   a splitter having an input port, a first output port and a second output port, wherein the splitter is configured to divide optical power received at the input port unequally to the first output port and second output port;
   a first optical path connected to the first output port;
   a first optical modulator located in the first optical path;
   a second optical path connected to the second output port;
   a second optical modulator located in the second optical path;
   a polarization rotator configured to make a polarization of a first optical signal in the first optical path approximately orthogonal to a polarization of a second optical signal in the second optical path; and
   a combiner having a first input port connected to the first optical path and a second input port connected to the second optical path and configured to combine the first optical signal and second optical signal into an output signal.

2. The optical modulation system of claim 1, wherein the splitter divides approximately two-thirds of the optical power into the first optical path and approximately one-third of the optical power into the second optical path.

3. The optical modulation system of claim 1, wherein the first and second optical modulators are on-off keying modulators.

4. The optical modulation system of claim 1, wherein the first and second optical modulators are timed such that centers of encoded symbols are approximately aligned when combined at the combiner.

5. The optical modulation system of claim 1, wherein the polarization rotator is incorporated in the splitter or the combiner.

6. The optical modulation system of claim 1, wherein the splitter divides approximately four-sevenths of the optical power into the first optical path and approximately three-sevenths of the optical power into the second optical path.

7. The optical modulation system of claim 6, wherein the first optical modulator is an on-off keying modulator and the second optical modulator is a PAM-4 modulator.

8. The optical modulation system of claim 1, wherein the output signal comprises a multilevel modulated signal having a number of levels greater than or equal to four.

9. The optical modulation system of claim 1, wherein the first optical modulator is a duo-binary modulator or a quadrature phase shift keying modulator.

10. The optical modulation system of claim 1, wherein the splitter comprises a Mach-Zehnder interferometer having a phase modulator in one arm.

11. The optical modulation system of claim 1, incorporated on a photonic integrated circuit wherein the first and second optical paths comprise semiconductor optical waveguides.

12. The optical modulation system of claim 1, wherein the splitter or combiner comprises a patterned grating coupler.

13. An optical modulation system comprising:
   a laser having a first output port and a second output port configured to output unequal amounts of power;
   a first optical path connected to the first output port;
   a first optical modulator located in the first optical path;
   a second optical path connected to the second output port;
   a second optical modulator located in the second optical path;
   a polarization rotator arranged to make a polarization of a first optical signal in the first optical path approximately orthogonal to a polarization of a second optical signal in the second optical path; and a combiner having a first input port connected to the first optical path and a second input port connected to the second optical path and configured to combine the first optical signal and second optical signal into an output signal.

14. The optical modulation system of claim 13, wherein the first and second optical modulators are on-off keying modulators.

15. The optical modulation system of claim 13, wherein the first optical modulator is a duo-binary modulator or a quadrature phase shift keying modulator.

16. The optical modulation system of claim 13, wherein the output signal comprises a multilevel modulated signal having a number of levels greater than or equal to four.

17. A method for encoding information onto an optical signal, the method comprising:

splitting, with an optical splitter, optical power unequally into a first optical path and a second optical path;

modulating, with a first optical modulator, an optical signal in the first optical path to produce a first modulated signal;

modulating, with a second optical modulator, an optical signal in the second optical path to produce a second modulated signal;

rotating polarization to make polarization of the first modulated signal substantially orthogonal to polarization of the second modulated signal; and combining, with an optical combiner, the first modulated signal and second modulated signal after polarization rotation to produce an output signal.

18. The method of claim 17, wherein the first and second optical modulators are on-off keying modulators.

19. The method of claim 17, wherein the output signal comprises a multilevel modulated signal having a number of levels greater than or equal to four.

20. The method of claim 17, further comprising adjusting a power splitting ratio at the optical splitter to obtain predetermined amounts of power in the first optical path and second optical path and to convert from a first modulation format to a second modulation format.

21. A method for encoding information onto an optical signal, the method comprising:

producing simultaneously, with a laser, a first output signal and a second output signal;

receiving the first output signal in a first optical path;

receiving the second output signal in a second optical path;

modulating, with a first optical modulator, an optical signal in the first optical path to produce a first modulated signal;

modulating, with a second optical modulator, an optical signal in the second optical path to produce a second modulated signal;

rotating polarization to make polarization of the first modulated signal substantially orthogonal to polarization of the second modulated signal; and combining, with an optical combiner, the first modulated signal and second modulated signal after polarization rotation to produce an output signal.

22. The method of claim 21, wherein the output signal comprises a multilevel modulated signal having a number of levels greater than or equal to four.

23. The method of claim 21, wherein the first optical modulator is an on-off keying modulator, a duo-binary modulator, or a quadrature phase shift keying modulator.

* * * * *